United States Patent
Campau et al.

(10) Patent No.: US 8,070,995 B2
(45) Date of Patent: Dec. 6, 2011

(54) SYSTEM AND METHOD FOR ESTABLISHING PLUMBING KIT SPECIFICATIONS

(75) Inventors: Daniel N. Campau, Grand Rapids, MI (US); Roger C. Miller, Lebanon, TN (US)

(73) Assignee: Flow-Rite Controls, Ltd., Byron Center, MI (US)

( * ) Notice: Subject to any disclaimer, the term of this patent is extended or adjusted under 35 U.S.C. 154(b) by 1245 days.

(21) Appl. No.: 11/592,022

(22) Filed: Nov. 2, 2006

(65) Prior Publication Data

US 2008/0105321 A1    May 8, 2008

(51) Int. Cl.
*F16L 55/00* (2006.01)
(52) U.S. Cl. .................. 264/152; 138/104; 138/DIG. 11
(58) Field of Classification Search .................. 138/104, 138/120, 178, DIG. 11; 264/152
See application file for complete search history.

(56) References Cited

U.S. PATENT DOCUMENTS

| | | | | |
|---|---|---|---|---|
| 2,449,265 A * | 9/1948 | Williams | ...................... | 138/118 |
| 3,826,521 A * | 7/1974 | Wilhelmsen | ...................... | 285/15 |
| 4,416,309 A * | 11/1983 | Salim | ............................ | 138/104 |
| 5,778,942 A * | 7/1998 | Jewell | ........................... | 138/178 |
| 5,915,413 A * | 6/1999 | Helmsderfer | ................. | 137/375 |
| 6,692,035 B2 * | 2/2004 | Baruh | ............................. | 285/31 |
| 6,843,279 B1 * | 1/2005 | Ungemah | ..................... | 138/149 |
| 6,904,941 B2 * | 6/2005 | Howard | ........................ | 138/167 |
| 2004/0222626 A1 * | 11/2004 | Baruh | ............................. | 285/15 |

* cited by examiner

*Primary Examiner* — James Hook
(74) *Attorney, Agent, or Firm* — Warner Norcross & Judd LLP

(57) ABSTRACT

A system and method for establishing plumbing kit specifications for kits containing plastic hose or tubing for installation on boats, RVs or other uses where ruler markings are imprinted longitudinally along the outside surface of stock hose. The ruler markings can be spaced approximately one inch, or other distance, and can include a series of numerals such as 1-12 or 1-11 followed by a repeat symbol. The sequence can repeat indefinitely along the length of the hose. The method allows a length specification for a particular hose segment to be generated by cutting a piece of stock hose at a particular starting ruler mark, clamping or connecting it in place, and then completing the installation of the segment by cutting the second end to the correct length and clamping or connecting it in place. The length can then be computed by reading the ruler marks on the installed hose. This information can be entered as part of the specification for a hose kit.

5 Claims, 3 Drawing Sheets

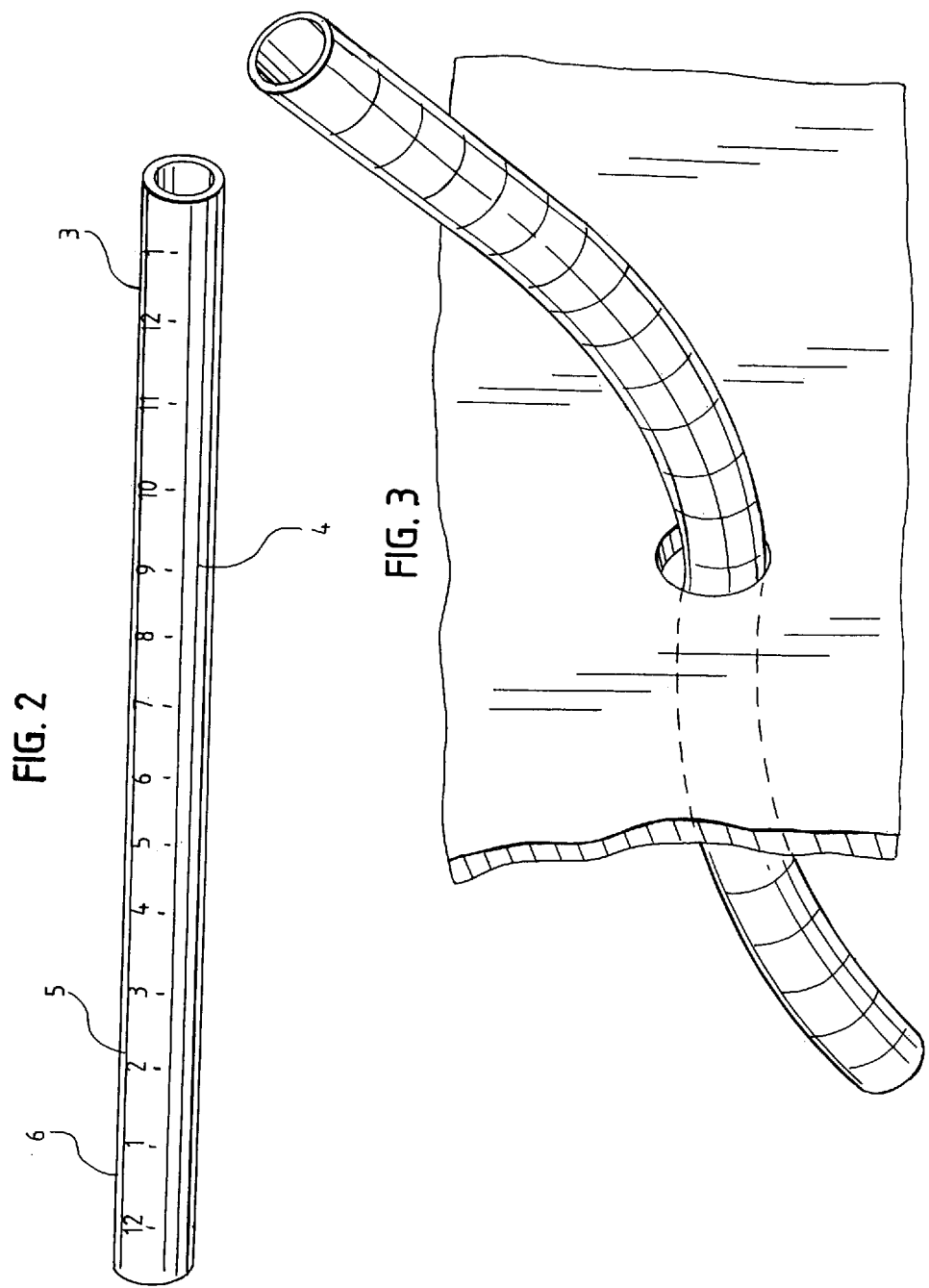

SYSTEM AND METHOD FOR ESTABLISHING PLUMBING KIT SPECIFICATIONS

BACKGROUND

1. Field of the Invention

The present invention relates generally to the field of plumbing kits and more particularly to an improved system and method for establishing plumbing kit specifications.

2. Description of the Prior Art

Plumbing kits are used in the marine industry and other industries for the quick installation of plastic or other plumbing systems. In particular, plumbing kits using quick connection sections of plastic hose or tubing are commonly installed aboard boats and recreational vehicles (RVs). In these installations, multiple segments of hose or tubing are used to interconnect plumbing components such as pumps, valves, manifolds, through-hull fittings, aerators, and many other types of equipment. Hose segments are generally cut to length at the time of installation in the boat or RV. Typically, this requires that for each segment installed, a piece of hose or tube is cut that is longer than needed for the final installation. One end of this hose or tube is then installed with a hose clamp or by other means, and the other end is trimmed to the exact length. Finally the second end is clamped or connected. This prior art method leads to a substantial waste of hose or tubing material, typically in excess of 15%; also installation time is substantial, because the process must be repeated for every segment installed. In addition, leaks at clamped joints are common and must be reworked, sometimes causing the entire segment to be re-cut and re-installed.

Quick connecting plumbing kits such as those manufactured by FlowRite Controls, Ltd. of Grand Rapids Michgan, and sold under the trademark QWIK-LOK, are being used extensively to attach hose and tubing without clamps. Kits are being sold that use these types of fittings, and many boat manufacturers have adapted these types of plumbing assemblies for all of the plumbing in all of their boat models. However, the problem described above still remains— namely, developing hose length specifications for all the different boat models of a particular manufacturer is a substantial undertaking in terms of engineering time and is fraught with inaccuracies and errors. There are generally two ways currently in use for determining hose segment lengths: 1) For each boat model, all of the hose segments are installed in the way previously described, and then all of the hoses removed and measured. Each hose segment's length is recorded, and the segment is re-installed. 2) Lengths are pre-measured for each segment, and each segment is cut extra-long to a recorded length. The hoses are installed, and each segment is cut to the correct length to finish the assembly. The cut-off waste pieces are then measured, and their lengths are subtracted from the recorded lengths for the segment to determine the true length. Both methods are slow and subject to considerable error. For example, errors occur because hose segments can be up to eighteen feet in length, and measurements taken on the assembly line are inconsistent and imprecise. Also, hose has a natural curl that can seriously affect the accuracy measurements. Hose is also quite elastic, and if pulled to straighten the curl, can stretch significantly, particularly in longer length segments.

It would be advantageous to have an system and method for establishing plumbing kit specifications for the lengths of each segment in a kit that would overcome the errors and tremendous engineering time presently encountered in determining those lengths.

SUMMARY OF THE INVENTION

The present invention relates to a plumbing tubing system and method for establishing plumbing kit specifications that includes a stock length of plastic hose where the hose has an outer surface with the ruled markings imprinted on it with the markings generally spaced by a predetermined distance like 1 inch. There can also be numbers or other indicia associated with the markings where the numbers increase sequentially to form a graduated scale, and where the sections of the scale can repeat periodically. A typical interval for the markings is 1 inch with a repeat every 12 inches, although any other intervals may be used. A special symbol can optionally be used for the 12th, or repeat, mark, and there can be other sub-markings with or without numerals to make the task of reading lengths easier.

The imprinted engineering tubing can be used to establish plumbing kit length specifications. Stock lengths of engineering hose with the imprinted ruler markings are used for an initial installation. A section is installed in a final location by cutting the hose at a particular ruler marking to create a first end, connecting the first end in position, running the hose into a final position, cutting the hose at the final position to create a second end, and connecting said second end in position. The final length can then be recorded by reading the ruler markings. The final length can then be added to the total kit hose length specification. Later production cut segments can optionally be measured and cut on the same machine that created the engineering hose for further accuracy and repeatability.

DESCRIPTION OF THE DRAWINGS

FIG. 2 is a side view of an embodiment of the engineering tubing of the present invention.

FIG. 3 shows a method of using the tubing of the present invention to determine a segment length specification.

Figure 1:
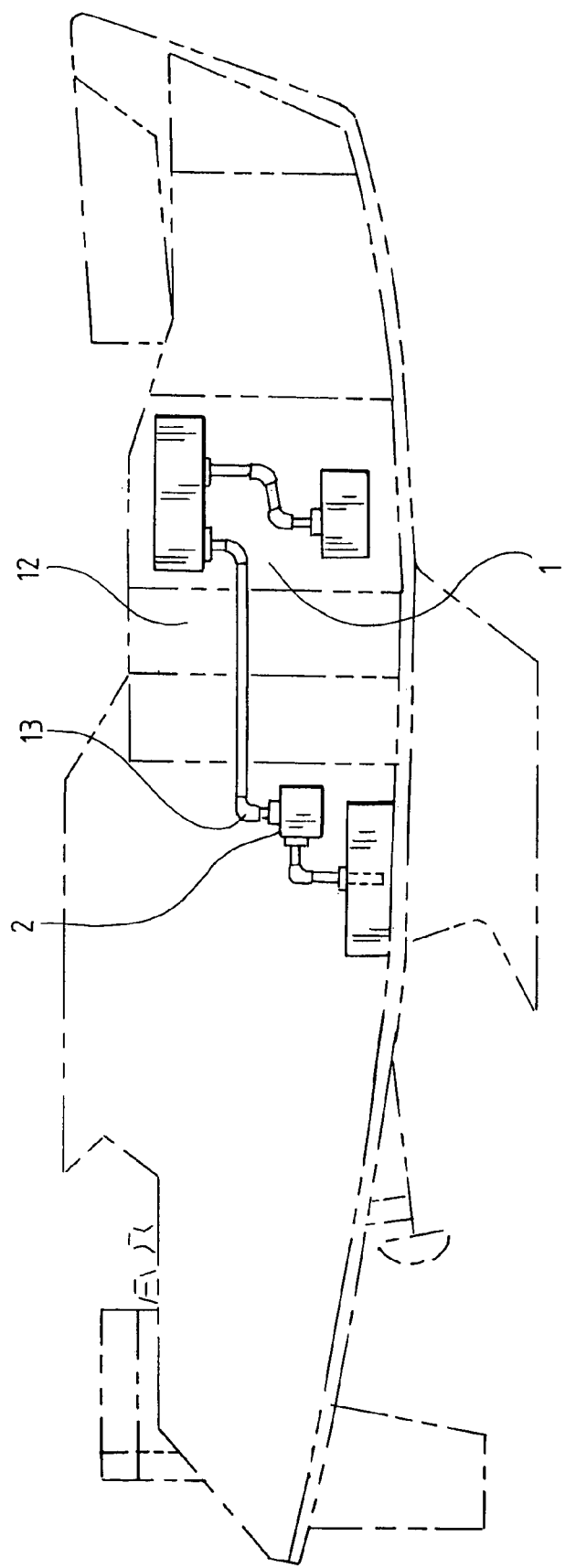
FIG. 1 is a view of a plumbing installation on a boat.
Figure 4:
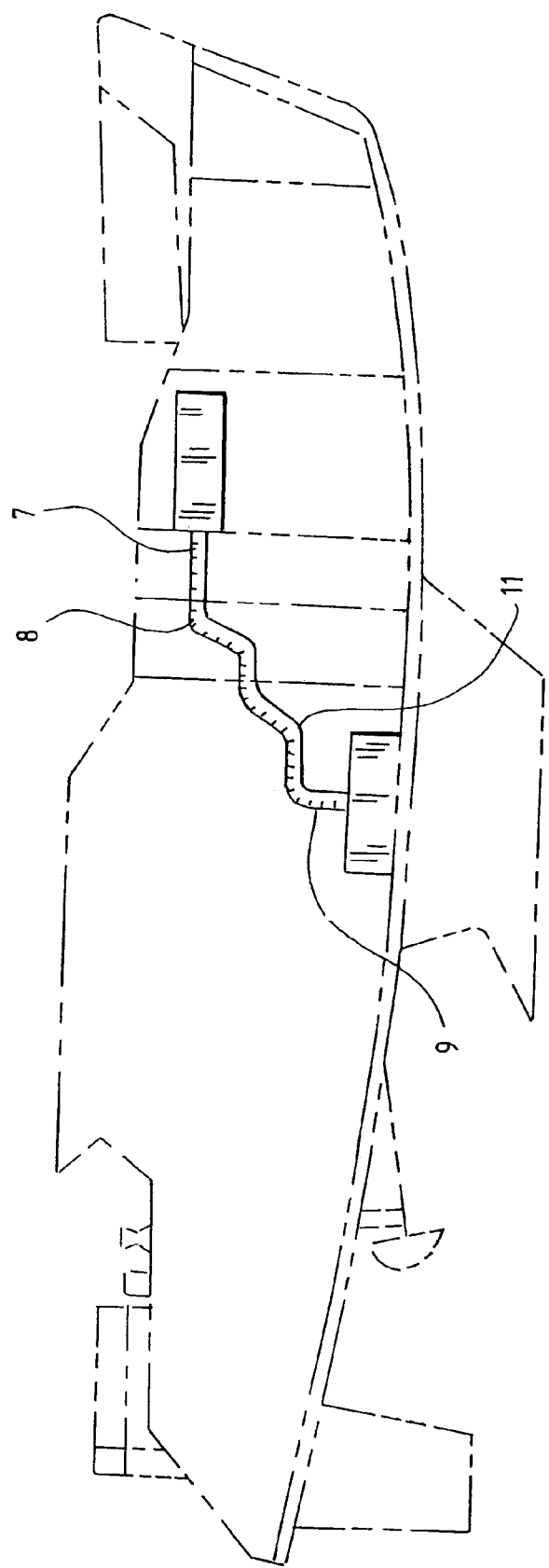

Several drawings and illustrations have been presented to aid in understanding the present invention. The scope of the invention is not limited to what is shown in the drawings.

DESCRIPTION OF THE INVENTION

The present invention relates to a system and method for making accurate specifications of hose length segments for hose kits that are used for plumbing boats, RVs and for other uses. The present invention eliminates the great amount of extra engineering time and the inaccuracies of prior art techniques.

Stock lengths of plastic hose are marked with ruler markings along their length when they are manufactured. The ruler markings can be spaced approximately one inch (or other convenient distance) and can include numerals such as 1-12 or 1-11 followed by a special 1 foot symbol, where the group repeats. Any spacing interval and any repeat interval is within the scope of the present invention. The invention allows a length specification for a particular hose segment to be generated by cutting a piece of stock hose at a particular starting ruler marking or connecting it in place as a first end, and then completing the installation of the segment by cutting the second end to the correct length and clamping or connecting it in place. The length of the installed can then be computed by reading the ruler marks on the installed hose without removing it. This information can then be entered as part of the total specification for the kit.

In later production of the kits, a cutting machine can be set or programmed to automatically cut hose to the correct segment lengths as each kit is produced. The present invention can solve the problem of inaccurate measurement on the factory floor by optionally using the same machine that later in production will measure and cut the final segments to imprint the graduated ruler marks or length scale on the initial reel of engineering hose. Engineering hose can be produced in standard lengths such as on reels of typically 100 feet similar to production hose. Using hose from the marked engineering reel for the initial installation provides an accurate and fast way for the boat or RV manufacturer to establish the hose lengths for new models and specify them back to the kit maker. The present invention makes it very efficient for manufacturers to outfit their entire fleet of production models with kits.

Turning to FIG. 1, a typical hose segment on a boat can be seen. A hose is attached at a first end 1. The hose runs through a series of compartments 12 and bends 13 and finally ends up at a second end 2. The two ends can be clamped, connected or attached in any manner including the quick release locking method described above.

FIG. 2 shows a side view of a length of engineering hose 3 that has been imprinted with ruler marks 4 with an integer ruler numeral 5 associated with each mark. It is not essential that every mark have a numeral. The numerals can repeat at predetermined intervals. It is advantageous to optionally use a special repeat symbol 6 whenever the numeral pattern repeats. In FIG. 2, the numerals 5 run from 1 to 11 followed by a repeat symbol 6 (thus causing the entire group to repeat every foot). Any spacing can be used between the marks including centimeter or 10 centimeter spacing for European installations or other spacings. The repeat point using a special symbol, or simply another numeral, can repeat at any convenient length. In a European system, the repeat could be at 1 meter or other intervals. Any ruler mark distance and any repeat length is within the scope of the present invention.

A method of generating a particular segment specification is shown in FIG. 3. A first end 7 of a piece of stock imprinted engineering hose 8 is cut at a repeat point (or any arbitrary point). The first end 7 is clamped or connected, and the rest of the segment is installed. The final end 9 is cut to length and also clamped or connected. The length is then conveniently read off the ruler scale 11 and recorded as the specification for that segment. The entire installation proceeds this way until the last segment has been installed. The result is a set of lengths that, are the complete hole length specifications for a hose kit for that model. Production hose kits can then be made by cutting segments to the specified lengths on the same or similar machine that produced the imprinted engineering hose.

Several descriptions and illustrations have been presented to aid in the understanding of the present invention. One skilled in the art will realize that numerous changes and variations are possible without departing from the spirit of the invention. All of these changes and variations are within the scope of the present invention.

We claim:

1. A method of establishing a plumbing kit specification comprising the steps of:

printing markings and repeating sequences of indicia longitudinally on flexible hose, the markings longitudinally spaced by a predetermined distance, each of said indicia associated with a particular one of said markings, said sequences of indicia repeated at a predetermined interval;

installing an engineering section of said hose in a particular location by cutting said hose at a first marking to create a first end, connecting said first end in position, running said hose into a final position, cutting said hose at a second marking to create a second end, and connecting said second end in position;

recording a final length of said section as a function of said first and second markings;

including said final length in a plumbing kit specification; and subsequently cutting production segments of said hose, each said production segment having said final length as included in said plumbing kit specification.

2. The method of claim 1 wherein said markings are spaced at approximately one inch intervals.

3. The method of claim 1 wherein said associated indicia are either integers or symbols.

4. The method of claim 1 wherein:

said installing, recording, including, and cutting steps are performed for a plurality of different hose segments; and said method further comprises producing a hose kit including one of the production segments from each set of performed steps.

5. The method of claim 1 wherein the print and cutting steps are performed using the same machine.

* * * * *